Dec. 7, 1937. C. R. DUNCAN 2,101,311
FLANGED TUBULAR ARTICLE AND METHOD OF MAKING SAME
Filed May 3, 1935
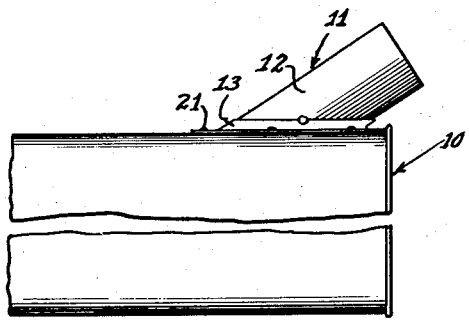
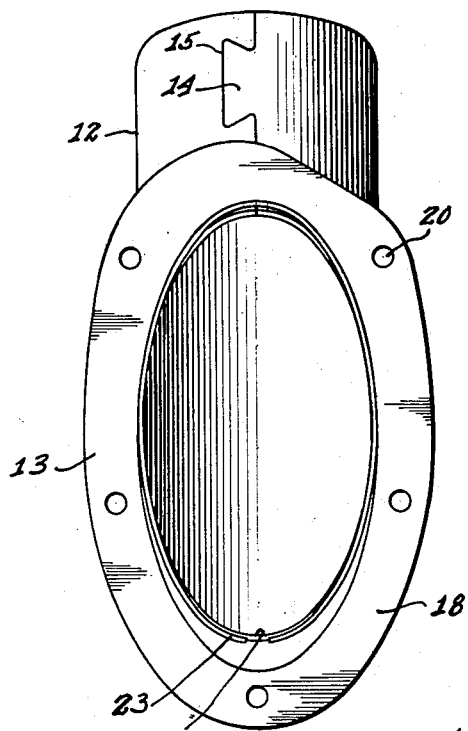
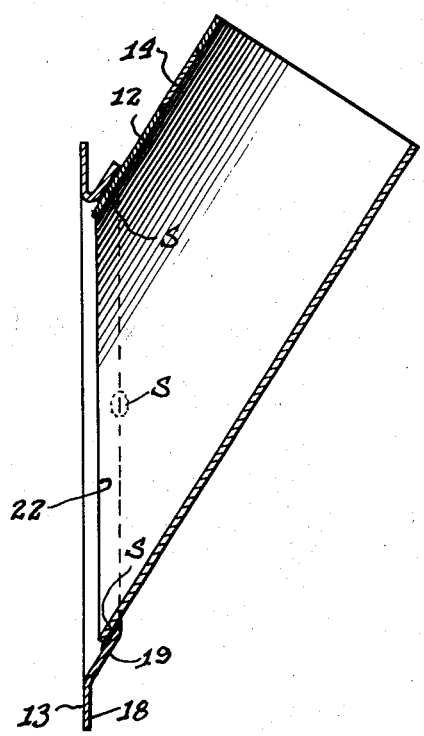
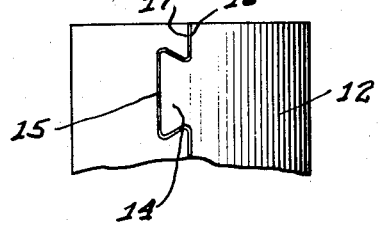
Inventor
Charles R. Duncan.
by Charles H. Hills Attys.

Patented Dec. 7, 1937

2,101,311

UNITED STATES PATENT OFFICE 2,101,311

FLANGED TUBULAR ARTICLE AND METHOD OF MAKING SAME

Charles R. Duncan, Waukegan, Ill., assignor to Oakes Products Corporation, North Chicago, Ill., a corporation of Michigan Application May 3, 1935, Serial No. 19,550

1 Claim. (Cl. 138—47)

This invention relates to a flanged tubular article and to a method of making the same, and more particularly to the manufacture of a gasoline tank filler flange assembly.

It has heretofore been customary in making flanged tubular articles to make them in one piece by a series of stamping or drawing operations. Where a deep draw is required, it may be necessary to perform several separate and distinct operations to produce the final article.

According to my present method, a flanged tubular article is produced in a simpler and less expensive way from two pieces of sheet metal rather than from a single piece. The tubular portion of the article is formed by bending or rolling one piece of sheet metal into the form of a tube and the flange is formed separately from another piece of sheet metal in a single cutting and stamping operation. The members are then temporarily united and permanently welded together, preferably by the use of a copper containing brazing material and a reducing atmosphere.

It is therefore an important object of this invention to provide a flanged tubular article formed from two pieces of sheet metal cut and stamped to shape and welded together into a unitary assembly.

It is a further important object of this invention to provide a simple and inexpensive method of making flanged tubular articles from sheet metal, using copper hydrogen welding to unite the parts together.

Other and further important objects of this invention will be apparent from the disclosures in the specification and the accompanying drawing.

This invention (in a preferred form) is illustrated in the drawing and hereinafter more fully described.

On the drawing:

Figure 1 is a broken elevational view of a gasoline tank having attached thereto a flanged filling spout.

Figure 2 is a plan view of a gasoline tank filler flange assembly illustrating a step in its manufacture.

Figure 3 is a longitudinal sectional view of the finished article.

Figure 4 is a fragmentary detail view.

As shown on the drawing:

The reference numeral 10 indicates generally a gasoline tank having attached thereto a flanged filling spout 11 embodying the principles of my invention. It will be understood that this constitutes merely an illustration of an embodiment of my invention and that the invention contemplates broadly the manufacture of any flanged tubular article from sheet metal.

Said filling spout 11 comprises a tubular portion 12 and a flange 13 adapted to be secured thereto. The tubular portion 12 is suitably formed from a single piece of sheet metal by cutting a piece of sheet metal to provide interfitting elements, such as the tongue 14 and recess 15 along opposite edges 16 and 17, respectively. The tongue 14 and recess 15 are preferably wedge shaped so that when the edges 16 and 17 are bent over into abutting relation, the tongue 14 may be interlocked, or dovetailed, into the recess 15 to hold the sheet metal in tubular form.

The flange 13 is formed in a single operation from sheet metal, as by cutting and stamping, to provide an annular flange 18 and a tubular flange 19 angularly disposed thereto. Apertures 20 are formed at the same time in the annular flange 18 for receiving rivets 21 or the like, by means of which the filling spout may be attached to the gasoline tank 10.

The flange 13 is then inserted over the beveled edge 22 of the tubular member 12 and is secured in place thereon by suitable means, such as spot welding at points S. A wire 23 of brazing material, such as copper or brass, is then laid around the beveled end 22 of the tubular member 12 at the joint with the flange 19. The thus assembled unit is then subjected to a welding temperature, as by passing the unit through a furnace having a reducing atmosphere, such as hydrogen or a mixture of gases containing hydrogen. Under these conditions the brazing wire 23 melts and is drawn by capillarity not only into the joint between the tubular flange 19 and the end 22 of the tubular member 12 but also into the joint between the abutting edges 16 and 17. The tubular member 12 is thus welded to the flange 13 and the seam between the abutting edges 16 and 17 is closed by the welding of these two edges together.

It will be appreciated that the above described method is less expensive than that heretofore practiced of forming a flanged tubular article by a series of drawing operations. My above method is believed to be applicable to the manufacture of flanged tubular articles generally where the weight of such articles is relatively slight and they can be made from light weight sheet metal.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

A filling spout for a gasoline tank, said spout comprising a smooth walled cylinder formed from a single piece of sheet metal having welded interlocking edges and having a beveled end, and a flange formed from a single piece of sheet metal and having a sleeve for telescopically receiving said beveled end in snug fitting full cylindrical surface contact therewith, said sleeve and beveled end being welded together throughout said surface contact area.

CHARLES R. DUNCAN.